(12) United States Patent
Yu

(10) Patent No.: US 8,368,520 B2
(45) Date of Patent: Feb. 5, 2013

(54) NOTIFICATION SYSTEM FOR TIMED POWER SUPPLY

(76) Inventor: Shu-Feng Yu, Sindian (TW)

( * ) Notice: Subject to any disclaimer, the term of this patent is extended or adjusted under 35 U.S.C. 154(b) by 260 days.

(21) Appl. No.: 12/955,082

(22) Filed: Nov. 29, 2010

(65) Prior Publication Data

US 2012/0133505 A1    May 31, 2012

(51) Int. Cl.
*G08B 1/00*    (2006.01)
(52) U.S. Cl. .............. 340/309.7; 340/4.35; 340/7.61; 340/7.62; 340/309.16; 340/309.8
(58) Field of Classification Search .......... 340/4.35, 340/7.61, 7.62, 309.7–309.9, 309.16
See application file for complete search history.

(56) References Cited

U.S. PATENT DOCUMENTS

| | | | | | |
|---|---|---|---|---|---|
| 4,906,972 A | * | 3/1990 | Spencer | ................... | 340/539.11 |
| 5,222,053 A | * | 6/1993 | Ohhira | ............................ | 368/73 |
| 5,592,032 A | * | 1/1997 | Keizer et al. | ................... | 307/116 |
| 5,610,586 A | * | 3/1997 | Zeytoonjian et al. | ......... | 340/571 |
| 5,734,206 A | * | 3/1998 | Keizer et al. | ................... | 307/116 |
| 6,317,040 B1 | * | 11/2001 | Ikeda | ............................ | 340/522 |
| 6,664,887 B1 | * | 12/2003 | Fuchs | ...................... | 340/309.16 |
| 2009/0140844 A1 | * | 6/2009 | Roychowdhury | ....... | 340/309.16 |

* cited by examiner

*Primary Examiner* — Daniel Wu
*Assistant Examiner* — Son M Tang
(74) *Attorney, Agent, or Firm* — Bacon & Thomas, PLLC

(57) ABSTRACT

The present invention is to provide a notification system for timed power supply, which includes a timed power supply device and a wireless notification device. The timed power supply device is able to receive a set time inputted by a user and stores the set time into a memory module, and then starts timing, providing power supply and generating an elapsed time, respectively. When the timed power supply device determines that the difference between the elapsed time and the set time reaches a threshold value, the timed power supply device issues a notification signal through a wireless transmitter module to the wireless notification device carried by the user, so as to ensure that the user will be notified, via an alert signal generated by the wireless notification device according to the notification signal, that the set time is coming to an end.

12 Claims, 3 Drawing Sheets

NOTIFICATION SYSTEM FOR TIMED POWER SUPPLY

FIELD OF THE INVENTION

The present invention relates to a notification system for timed power supply, which is able to receive a set time inputted by a user and drives a timer module to start timing and thereby generates an elapsed time. When the difference between the elapsed time and the set time reaches a threshold value, the notification system issues a notification signal to a wireless transmitter device carried by the user, so as to ensure that the user will be notified that the set time is coming to an end.

BACKGROUND OF THE INVENTION

Barbecue is a very popular activity worldwide. Family and friends gather together at a barbecue not only to enjoy the fun of cooking but also to strengthen interpersonal bonds.

Conventionally, barbecuing involves putting hot charcoal in a charcoal pan, placing a barbecue rack above the charcoal, and laying food on the rack. Thus, the food is spaced from the charcoal and gradually cooked by the heat thereof. During the grilling process, it is common practice to turn the food with tongs so that the food is heated evenly. Alternatively, the food to be cooked is held by a spit provided above hot charcoal and is turned, during the roasting process, by rotating the spit. To prevent the food from charring or being overcooked, it is necessary to turn the food on a regular basis, which is very inconvenient.

As a solution to the aforesaid problem, electric barbecue apparatuses were developed and are now commercially available. Basically, an electric barbecue apparatus uses a motor to rotate a spit, thus allowing the food secured on the spit to rotate along with the spit and be exposed uniformly to the heat of charcoal. By doing so, the food is heated evenly and kept from burning. As the user need not use tongs or other tools to turn the food being cooked, electric barbecue apparatuses are effective in saving time and energy, thus making barbecue more convenient. However, if the user has other things to tend to during the roasting process and must leave the electric barbecue apparatus, the food being roasted is very likely to be forgotten and eventually become scorched or overcooked, which is highly undesirable.

To prevent such undesirable situations, an experienced user would use a timer with an alerting function, predetermine the required roasting time according to the type and thickness of food, set the roasting time with the timer, and place the timer around the electric barbecue apparatus. When the roasting time is up, the timer issues a sound alert to notify the user. Nonetheless, if the user is away from the electric barbecue apparatus at this moment, it will be impossible for the user to hear the sound alert. As a result, the best time at which to remove the food from the electric barbecue apparatus is missed, and the food may end up burned or overcooked.

Therefore, the issue to be addressed by the present invention is to solve the various problems described above and design a notification system for timed power supply whereby a user will be notified in a remote manner that a preset time is about to be up, thus allowing the user to remove food from an electric barbecue apparatus timely.

BRIEF SUMMARY OF THE INVENTION

In view of the problems frequently encountered in barbecuing, the inventor of the present invention conducted extensive research and experiment and finally succeeded in developing a notification system for timed power supply as disclosed herein. The disclosed notification system can timely notify the user that a preset roasting time is about to be up even if the user is away from the food being roasted. Thus, the user is allowed sufficient time to go back to the food and take necessary actions to prevent the food from charring or being overcooked.

It is an object of the present invention to provide a notification system for timed power supply, wherein the notification system includes a timed power supply device and a wireless notification device. The timed power supply device includes a power switching module, a first control module, a memory module, a control interface, a timer module, and a wireless transmitter module. The power switching module is connected to an external power source and a motor respectively, so as to receive electricity from the external power source and deliver the electricity to the motor, thereby driving the motor (and a spit connected thereto) to rotate. The first control module is connected to the power switching module, the memory module, the control interface, the timer module, and the wireless transmitter module respectively. The first control module receives a set time through the control interface and stores the set time into the memory module. The first control module drives the timer module to start timing and thereby generate an elapsed time, wherein the elapsed time is the time elapsed since the timer module is driven. The first control module compares the elapsed time with the set time. If the difference between the elapsed time and the set time reaches a threshold value, the first control module issues a notification signal through the wireless transmitter module. The wireless notification device includes a second control module, a wireless receiver module, and an alert module. The second control module is connected to the wireless receiver module and the alert module respectively. Upon receiving the notification signal through the wireless receiver module, the second control module drives the alert module to generate an alert signal (e.g., a continuous sound) for alerting the user to the fact that the difference between the elapsed time and the set time has reached the threshold value. Thus, the user is allowed time to move to the motor and take off the food. In short, after setting the time of the timed power supply device, the user may carry the wireless notification device with him/her and go somewhere else, without having to wait by the motor. As the wireless notification device is carried with the user, it is ensured that the user will be notified, via the alert signal of the wireless notification device, that the set time is coming to an end, so the user can remove the food from the spit in a timely manner to control the degree of cooking and prevent the food from being burned.

It is another object of the present invention to provide the foregoing notification system for timed power supply, wherein upon determining that the elapsed time is equal to the set time, the first control module issues a power-off instruction to the power switching module so that the power switching module cuts off the electricity supplied to the motor. As a result, the motor stops rotating the spit, and the user, once spotting the stationary spit, knows the set time is up.

It is yet another object of the present invention to provide the foregoing notification system for timed power supply, wherein the timed power supply device further includes a display module connected to the first control module. The first control module obtains the elapsed time from the timer module and sends the elapsed time to the display module for display.

Still another object of the present invention is to provide the foregoing notification system for timed power supply, wherein the control interface includes a start button. When the start button is pressed, the control interface issues an activation instruction or a deactivation instruction to the first control module, so as for the first control module to activate or deactivate the timing function of the timer module accordingly.

BRIEF DESCRIPTION OF THE SEVERAL VIEWS OF THE DRAWINGS

The structure as well as a preferred mode of use, further objects, and advantages of the present invention will be best understood by referring to the following detailed description of a preferred embodiment in conjunction with the accompanying drawings, in which.

DETAILED DESCRIPTION OF THE INVENTION

The inventor of the present invention has long been engaged in the research and development and sales of barbecue apparatuses. During this process, the inventor has found that users are very likely to forget the food being barbecued and hence let it burned without knowing it. While some users would use an additional timer with an alerting function as a reminder and put the timer on the electric barbecue apparatus, the alerting sound of the timer will not be heard if the users are away from the electric barbecue apparatus. Should it happen, the unattended barbecue may still be charred. Some fellow colleagues in the industry have also dedicated themselves to overcoming the aforementioned problems, but the ideal solution is yet to be found. Therefore, the inventor came up with the concept of integrating the setting of cooking time with wireless transmission technology, so as to design a notification system for timed power supply that is capable of notifying the user in a timely (remote) manner.

Figure 1:
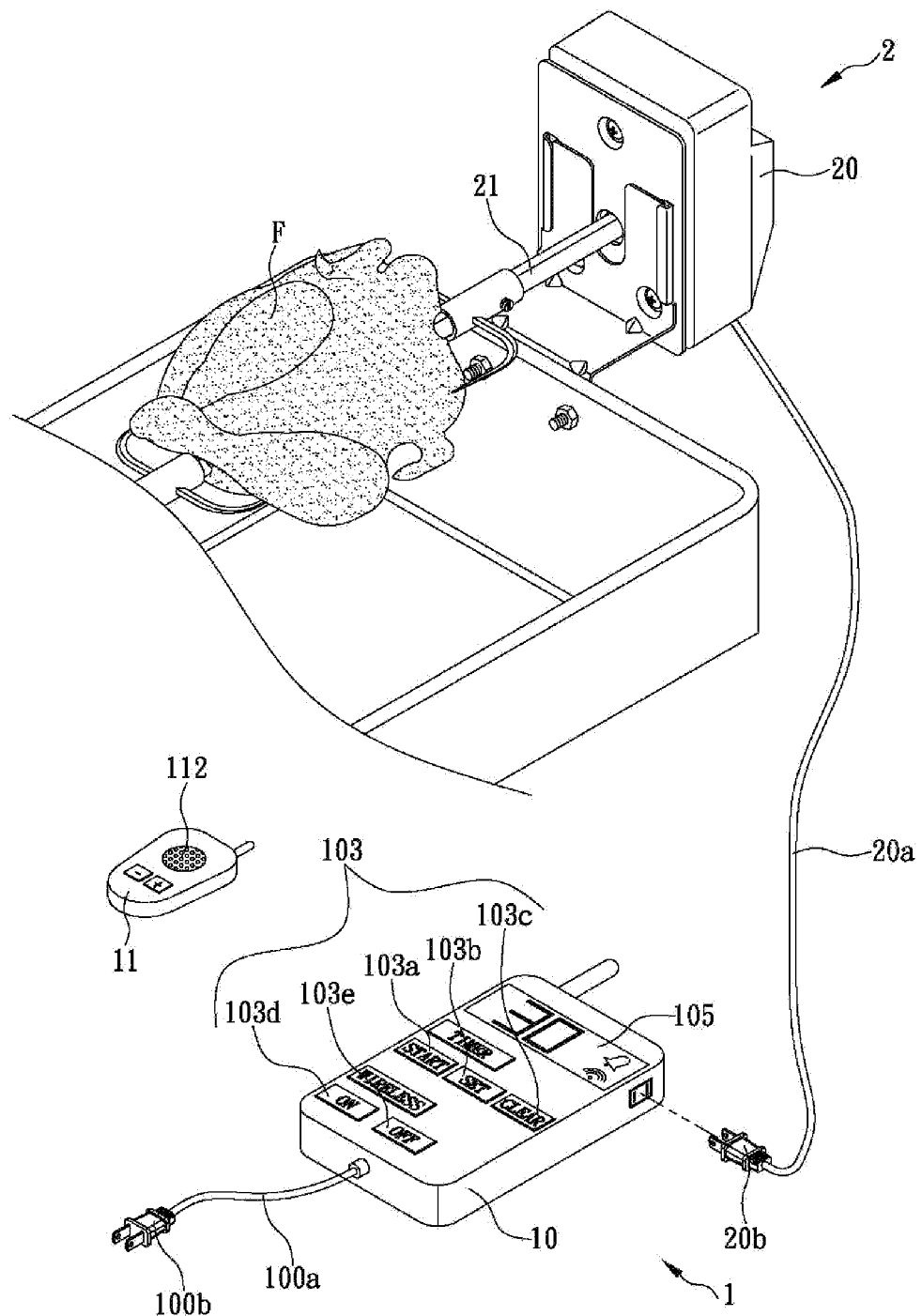
FIG. 1 is a perspective view of the preferred embodiment of the present invention.
Figure 2:
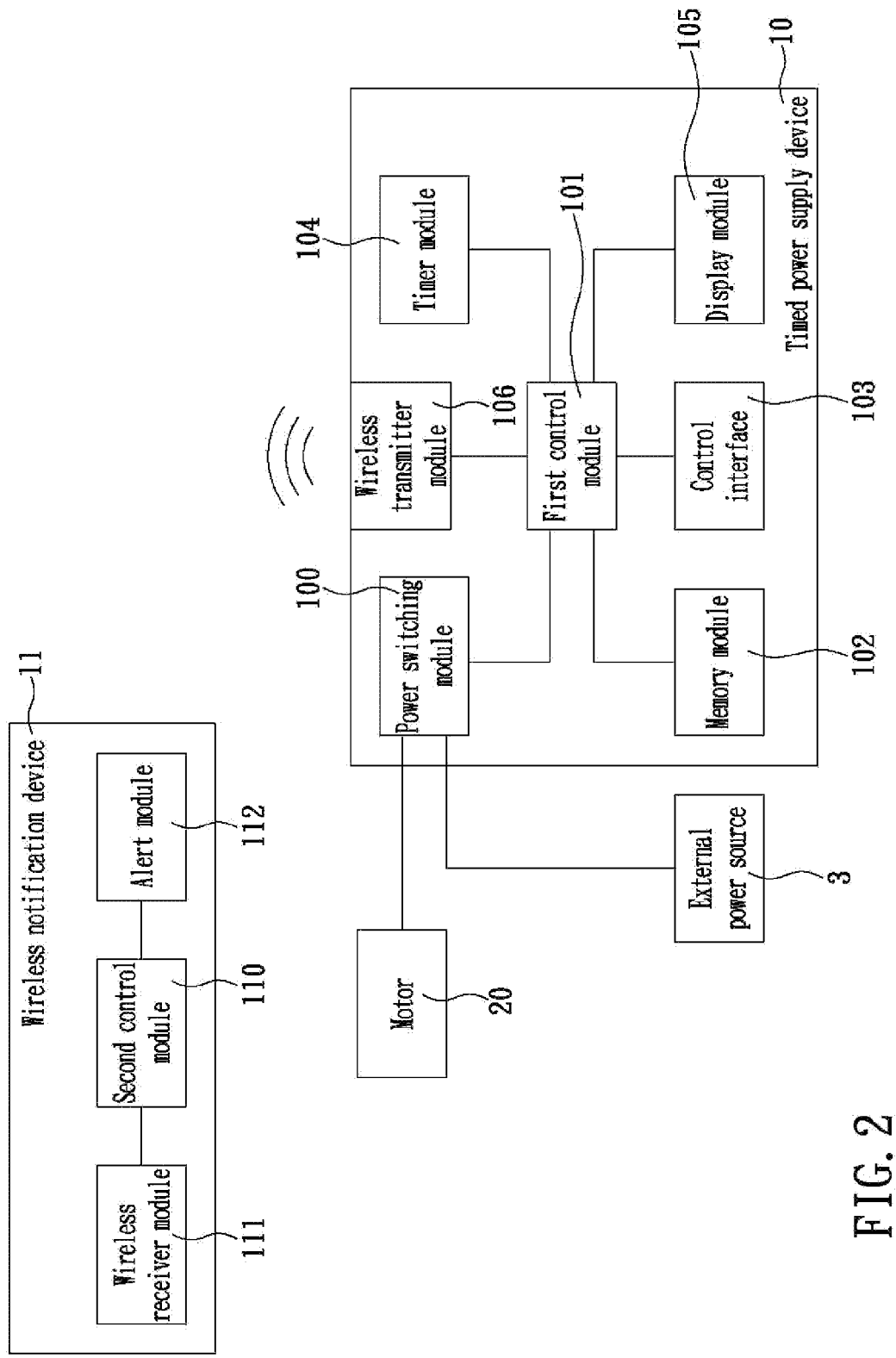
FIG. 2 is a circuit block diagram of the preferred embodiment of the present invention.

The present invention provides a notification system for timed power supply. Referring to FIG. 1 for a preferred embodiment of the present invention, a notification system 1 for timed power supply is used in conjunction with an electric barbecue apparatus 2. The electric barbecue apparatus 2 includes a motor 20 which is connected with a spit 21 for holding food F. When powered on, the motor 20 rotates the spit 21 so that the food F thereon is roasted evenly by hot charcoal (not shown). The notification system 1 includes a timed power supply device 10 and a wireless notification device 11. Referring to FIG. 2, the timed power supply device 10 includes a power switching module 100, a first control module 101, a memory module 102, a control interface 103, a timer module 104, a display module 105, and a wireless transmitter module 106. The power switching module 100 is connected to an external power source 3 and the motor 20 respectively. As shown in FIGS. 1 and 2, the power switching module 100 is connected to the external power source 3 via a power cord 100a and a plug 100b, while the motor 20 is electrically connected to the power switching module 100 via a power cord 20a and a plug 20b. With reference to FIG. 2, the power switching module 100 receives electricity from the external power source 3 and delivers the electricity to the motor 20 such that the motor 20, upon receiving the electricity, is driven to rotate. The first control module 101 is connected to the power switching module 100, the memory module 102, the control interface 103, the timer module 104, the display module 105, and the wireless transmitter module 106 respectively. The control interface 103 is a set of buttons and, as shown in FIG. 1, includes a start button 103a, a time setting button 103b, a clear button 103c, and a set of power-on/off buttons 103d, 103e. A user can input a set time by operating the time setting button 103b or clear the set time by pressing the clear button 103c. In this preferred embodiment, the set time is 30 minutes; in other words, the user intends to roast the food F for 30 minutes. The display module 105 is a liquid crystal display (LCD) screen and is depicted in FIG. 1 as displaying the aforesaid set time (i.e., 30 minutes). In FIG. 2, the memory module 102 is a flash memory, and yet the memory module 102 is not limited thereto. Manufacturers of the timed power supply device 10 may use other types of memories, such as random access memory (RAM), as the memory module 102.

Figure 3:
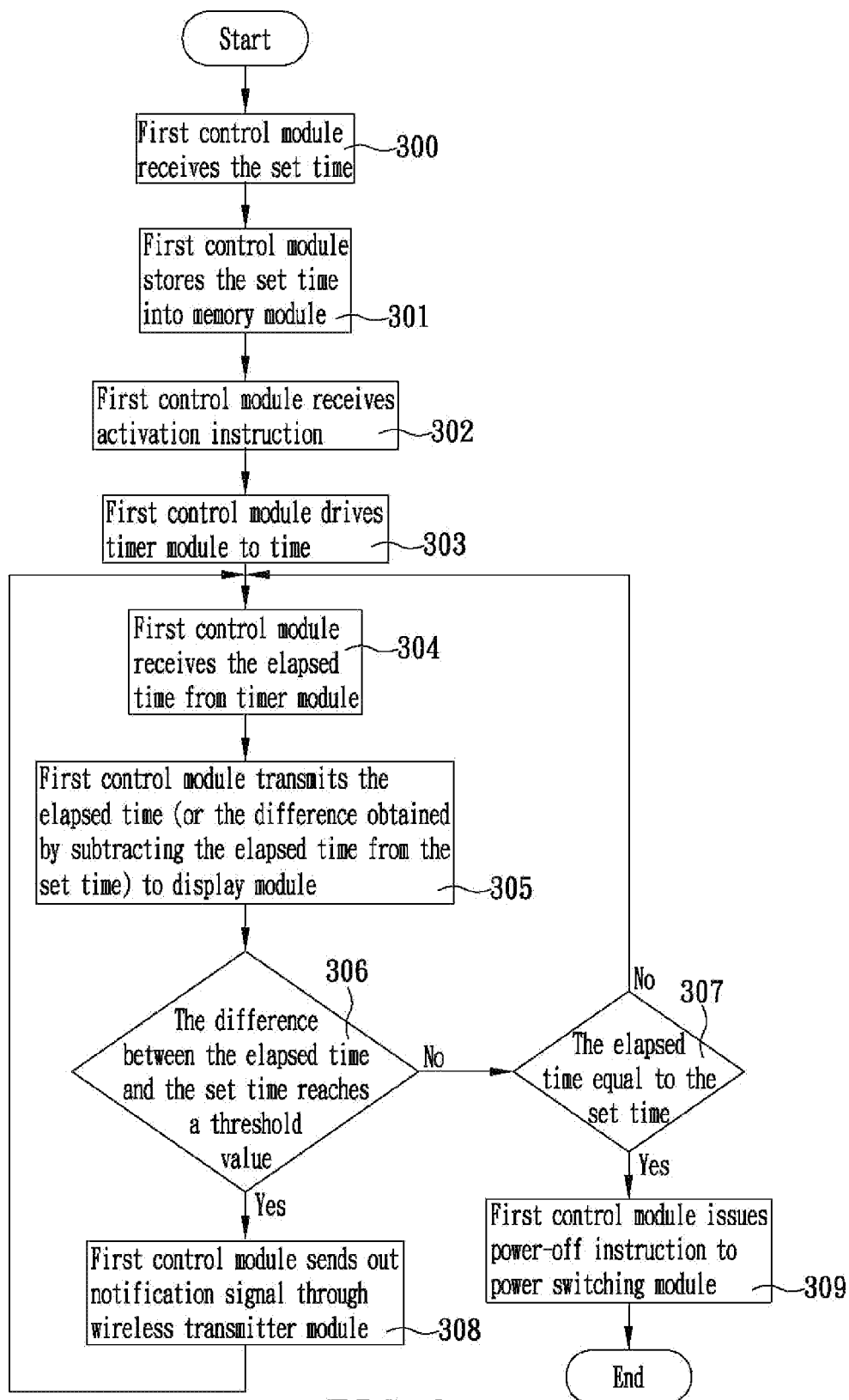
FIG. 3 is a flowchart of the preferred embodiment of the present invention.

Referring to FIGS. 2 and 3, the first control module 101 sends out a notification signal through the wireless transmitter module 106 by the following steps:

(300) The first control module 101 receives through the control interface 103 the set time input by the user, wherein the set time is input by pressing the time setting button 103b (FIG. 1).

(301) The first control module 101 stores the set time into the memory module 102.

(302) The first control module 101 receives an activation instruction or a deactivation instruction through the control interface 103, wherein the activation instruction or the deactivation instruction is generated by the user pressing the start button 103a (FIG. 1).

(303) Upon receiving the activation instruction, the first control module 101 activates the timing function of the timer module 104 according to the activation instruction, so as for the timer module 104 to start timing and generate an elapsed time, wherein the elapsed time indicates the roasting time that has elapsed (i.e., the time elapsed since the timer module 104 is driven). Then, the process goes on to Step (304). However, if it is the deactivation instruction that the first control module 101 receives, the first control module 101 will deactivate the timing function of the timer module 104 according to the deactivation instruction. Consequently, the timer module 104 does not perform its timing function, and the power switching module 100 continues supplying electricity to the motor 20.

(304) The first control module 101 receives the elapsed time from the timer module 104, wherein the elapsed time is transmitted periodically from the timer module 104 to the first control module 101.

(305) The first control module 101 transmits the elapsed time (or the difference obtained by subtracting the elapsed time from the set time) to the display module 105, so as for the display module 105 to display the elapsed time (or the aforesaid difference). For example, when the elapsed time is 1 minute, the display module 105 displays "01" (or "29"). Thus, the user can know the elapsed (or remaining) roasting time by looking at the display module 105.

(306) The first control module 101 compares the elapsed time with the set time. If the difference between the elapsed time and the set time reaches a threshold value (e.g., 5 minutes), then Step (308) is performed; otherwise, go to Step (307).

(307) The first control module 101 compares the elapsed time with the set time. If the elapsed time is equal to the set time, the process goes on to Step (309); otherwise, go back to Step (304).

(308) The first control module 101 sends out a notification signal through the wireless transmitter module 106. Then, go back to Step (304).

(309) The first control module 101 issues a power-off instruction to the power switching module 100, so as for the power switching module 100 to cut off the electricity supplied to the motor 20.

As shown in FIGS. 1 and 2, the wireless notification device 11 includes a second control module 110, a wireless receiver module 111, and an alert module 112. The second control module 110 is connected to the wireless receiver module 111 and the alert module 112 respectively. In this preferred embodiment, the alert module 112 is a loudspeaker. After the first control module 101 sends out the notification signal through the wireless transmitter module 106 in Step (308), the second control module 110 receives the notification signal via the wireless receiver module 111 and, in response, drives the alert module 112 to generate an alert signal, such as a continuous sound, for alerting the user. Upon hearing the alert signal, the user is notified that the difference between the elapsed time and the set time has reached the threshold value or, in other words, the roasting time is about to end. Thus, the user is urged to move to the electric barbecue apparatus 2 (FIG. 1) in time. On the other hand, if Step (309) is performed, meaning that the roasting time has ended and that the power switching module 100 has stopped supplying electricity to the motor 20, the user will know the roasting time is up as soon as he/she notices that the motor 20 stops rotating, so the food F will also be removed from the electric barbecue apparatus 2 in a timely manner.

If the user presses the start button 103a during the roasting process such that the control interface 103 issues the deactivation instruction to the first control module 101, the first control module 101 will deactivate the timing function of the timer module 104 but will not give the power-off instruction to the power switching module 100. Consequently, the motor 20 will remain powered on and keep rotating.

It should be pointed out that, while the alert module 112 in this preferred embodiment is a loudspeaker, the present invention has no limitations in this regard. Manufacturers of the wireless notification device 11 may also use a vibrator as the alert module 112 according to practical needs. In that case, the second control module 110, upon receiving the notification signal, will drive the alert module 112 to vibrate so that the user, once feeling the vibration, is urged to move to the electric barbecue apparatus 2 immediately.

In summary, the technical features of the present invention allow a user to carry the wireless notification device 11 with him/her and leave the electric barbecue apparatus 2 after he/she secures the food F to the spit 21, sets the roasting time with the timed power supply device 10, and starts the timed power supply device 10. As it is unnecessary to wait by the motor 2, the user can perform other cooking preparations away from the electric barbecue apparatus 2 and thus save a lot of time. In addition, as the wireless notification device 11 can be carried with the user, it is ensured that the user will be notified, by the alert signal of the wireless notification device 11, that the set time (i.e., the set roasting time) is about to be up. Hence, the user can take the food F off the spit 21 in time to control the cooking degree of the food F and effectively prevent the food F from charring. Moreover, as the timed power supply device 10 is connectable with the plug 20b, the system of the present invention is conveniently applicable to electric barbecue apparatuses of different specifications.

While the invention has been described by means of specific embodiments, numerous modifications and variations could be made thereto by those skilled in the art without departing from the scope and spirit of the invention set forth in the claims.

What is claimed is:

1. A notification system for timed power supply, comprising:
a timed power supply device comprising a power switching module, a first control module, a memory module, a control interface, a timer module, and a wireless transmitter module, wherein the power switching module is connected to an external power source and a motor respectively and is configured to receive electricity from the external power source and deliver the electricity to the motor so as to drive the motor to rotate, the first control module is connected to the power switching module, the memory module, the control interface, the timer module, and the wireless transmitter module respectively, the first control module is configured to receive a set time through the control interface, store the set time into the memory module, and drive the timer module to start timing and thereby generate an elapsed time, and the first control module, upon determining that a difference between the set time and the elapsed time reaches a threshold value, sends out a notification signal through the wireless transmitter module; and
a wireless notification device comprising a second control module, a wireless receiver module and an alert module, wherein the second control module is connected to the wireless receiver module and the alert module respectively and, upon receiving the notification signal through the wireless receiver module, drives the alert module to generate an alert signal.

2. The notification system of claim 1, wherein the first control module, upon receiving an activation instruction through the control interface, drives the timer module to start timing and thereby generate the elapsed time.

3. The notification system of claim 2, wherein the timed power supply device further comprises a display module connected to the first control module, and the first control module receives the elapsed time from the timer module and transmits the elapsed time to the display module.

4. The notification system of claim 3, wherein the first control module, upon determining that the elapsed time is equal to the set time, issues a power-off instruction to the power switching module so as for the power switching module to cut off the electricity supplied to the motor.

5. The notification system of claim 4, wherein the control interface comprises a start button and, when the start button is pressed, transmits the activation instruction or a deactivation instruction to the first control module so as for the first control module to activate or deactivate a timing function of the timer module according to the activation instruction or the deactivation instruction.

6. The notification system of claim 5, wherein the alert module is a loudspeaker.

7. The notification system of claim 5, wherein the alert module is a vibrator.

8. The notification system of claim 2, wherein the timed power supply device further comprises a display module connected to the first control module, and the first control module receives the elapsed time from the timer module and transmits to the display module a difference obtained by subtracting the elapsed time from the set time.

9. The notification system of claim 8, wherein the first control module, upon determining that the elapsed time is equal to the set time, issues a power-off instruction to the power switching module so as for the power switching module to cut off the electricity supplied to the motor.

10. The notification system of claim 9, wherein the control interface comprises a start button and, when the start button is pressed, transmits the activation instruction or a deactivation instruction to the first control module so as for the first control module to activate or deactivate a timing function of the timer module according to the activation instruction or the deactivation instruction.

11. The notification system of claim 10, wherein the alert module is a loudspeaker.

12. The notification system of claim 10, wherein the alert module is a vibrator.

* * * * *